United States Patent Office

3,484,365
Patented Dec. 16, 1969

3,484,365
ASPHALTENE OXIDATION
Armin C. Pitchford, Bartlesville, Okla., assignor to Phillips Petroleum Company, a corporation of Delaware
No Drawing. Filed Oct. 24, 1966, Ser. No. 588,774
Int. Cl. C10g 27/04; C10c 3/04, 1/20
U.S. Cl. 208—44                                  9 Claims

ABSTRACT OF THE DISCLOSURE

Asphaltenes are contacted with an oxygen-containing gas such as air at 50–200° F. to reduce the melting point of the asphaltenes and produce liquid products useful as drying oils and refinery feedstocks.

---

This invention relates to the treatment of asphaltenes to produce useful liquid products therefrom. In accordance with one aspect, this invention relates to the contacting of asphaltenes with an oxygen-containing gas to reduce the melting point of the asphaltenes and produce fluid products useful as drying oils, refinery feedstock components, and the like. In accordance with a further aspect, this invention relates to the oxidation of asphaltenes with moist air under controlled conditions of temperature to produce useful liquid products from asphaltenes.

It is well known in the art to treat asphaltic-bitumens with an oxygen-containing gas at relatively high temperatures to improve their properties for employment as paving materials and the like. The products obtained according to the prior art possess desirable low temperature susceptibilities and higher melting point for a given penetration index as compared with unoxidized asphalts. Normally, temperatures of the order of 200–400° C. are employed with air blowing to produce asphalts that are harder and tougher than the starting asphaltic materials. The known art does not oxidize asphaltenes except as they are a component of asphalts, and then only at the relatively high temperatures required.

Certain asphaltic materials, notably Group II Monogas crude, and the like, contain relatively high percentages of asphaltenes (12–16 percent), such amounts of asphaltenes render the asphaltic materials very viscous, so that these materials can scarcely be handled in conventional equipment until deasphalted. It is well recognized in the art that the asphaltenes separated from asphaltic materials are of relatively little commercial value at present.

Accordingly, I have now discovered that such asphaltenes can now be oxidized under controlled conditions to produce fluid products of considerable value as drying oils, refinery feedstocks, etc.

Accordingly, it is an object of this invention to provide an improved process for the production of liquid products from asphaltenes having desirable properties.

It is another object of this invention to provide an economical and practical commercially feasible process for the oxidative treatment of asphaltenes to produce commercially useful liquid products.

Other aspects, objects and the several advantages of the invention will be apparent to those skilled in the art upon further reading of the specification and the appended claims.

In accordance with the invention, I have now discovered that asphaltenes can be treated with an oxygen containing gas at relatively low temperatures, up to about 200° F., to produce liquid products of considerable value.

The process of this invention is useful for the treatment of asphaltenes derived from conventional sources by conventional techniques. Known asphaltic products containing asphaltenes that can be oxidized according to the invention include heavy asphaltic crude oils, straight run residues of asphaltic crude oils, solvent tars produced by treatment of residues, cracked residues, and various petroleum asphalts. The asphaltenes that can be oxidized according to the invention can be separated, for instance, from Monogas crude oil or other heavy asphaltic crudes by extraction with pentane or similar hydrocarbon solvents or other known solvents to separate same from the crude. Hydrocarbon precipitation products of asphaltic refinery residues are also quite suitable for oxidation according to the invention.

The asphaltenes to be oxidized according to the invention can be contacted with an oxygen-containing gas by any conventional technique, including continuous, semi-continuous and batch operations. A presently preferred method of contacting the asphaltenes comprises passing a stream of an oxygen-containing gas heated to a temperature not in excess of about 200° F. through a bed of asphaltenes. The asphaltenes are ordinarily separated from asphaltic products as particulate materials, and, therefore, can be oxidized in a fluidized bed technique by contacting with an oxygen-containing gas. The contacting temperature for oxidation does not exceed 200° F., ordinarily will be in the range 50–190° F., and preferably 75–160° F.

The oxygen-containing gas to be contacted with the asphaltenes is conveniently air. However, any gas having components other than oxygen that are substantially inert to the oxidation reaction and oxygen or an oxygen yielding compound in an amount sufficient to obtain the degree of reaction desired can be employed. Oxygen, per se, can be employed if desired. It has been found, as demonstrated by the examples hereinbelow, that oxidation temperatures below 100° F. can be employed when utilizing oxygen as the oxidizing medium. Also, as demonstrated by the examples, air saturated with water vapor significantly increases the production of the desired liquid product from the asphaltenes. As demonstrated further by the specific examples, it has been found that the softening point of asphaltenes is reduced and that useful liquid products are produced, thereby rendering asphaltenes now considered of relatively little commercial value as commercially useful materials.

The liquid products produced by the oxidation of this invention can be separated from the asphaltenes by solvent extraction or other conventional methods and utilized as drying oils in paints, varnishes, and the like. The liquid products produced by the oxidation treatment, as well as the liquid product and unconverted asphaltenes, can be mixed with crude oil fractions or other fractions for utilization as refinery feedstocks. It is also within the scope of the invention to employ successive contacts with oxygen-containing gas and subsequent extraction to recover the liquid products.

The duration of contact of asphaltenes and oxygen-containing gas can be regulated to produce the degree of reaction desired. This is dependent on temperature, pressure, oxygen content of the oxygen-containing gas, the inherent nature of the asphaltenes, and other factors. When desired, catalysts known to promote oxidation including various metals and metal compounds can be used to facilitate the oxidative treatment of the invention. As indicated above, the temperature ordinarily will range from 50–190° F. In general, reaction times of between 10 minutes and 48 hours are satisfactory. The pressure to be employed can range between about 1 atmosphere and 20 atmospheres. In general, though, atmospheric pressure is convenient for carrying out the oxidation treatment. Usually, in the asphaltenes oxidation process a rate of about 0.1 to 4,000 standard cubic feet of oxygen-containing gas per hour per 100 gm. of asphaltene is employed.

EXAMPLE I

A sample of pulverized asphaltenes was prepared by the n-petane extraction of Monogas Zone II crude oil. The asphaltenes were extracted thoroughly with n-pentane and air dried. The product was oxidized as a thin layer on a tray in a stream of air in a forced draft oven at 130° F. for 16 hours. The reaction product was extracted with n-pentane. An oily-resinous extract was obtained, after the solvent had been stripped, in a yield of 13.5 weight percent of the asphaltenes. Infrared spectra indicated the presence of carbonyl and hydroxyl or amino adsorption bands in this extract. This oily extract product contained 1 percent nitrogen and had an average molecular weight of 718. The extract product also hardened to a tough film upon exposure to the atmosphere when painted on a surface.

EXAMPLE II

A sample of pulverized Wasson asphaltenes was found to contain 5.3 percent (by weight of the asphaltene starting material) extractables as determined by Soxhelt extraction with n-pentane. A layer of such pulverized asphaltenes in a tray was heated in an air stream in a forced draft oven at 130° F. for 6 hours. The product was then Soxhlet extracted with n-pentane and found to have 6 percent extractables, a gain of 0.7 percent, an increase of about 13 weight percent. The product can be used as a drying oil or refinery feedstock.

EXAMPLE III

A sample of the pulverized Wasson asphaltenes of Example II was placed in a column to a depth of 8 inches, and dry air was passed through the column for 1 hour at a temperature of 125° F. at a rate of 3 standard cubic feet per hour per 100 gm. of asphaltenes. The product of such treatment was then Soxhlet extracted and found to contain 8.2 percent extractables, a gain of 2.9 percent (of the weight of the starting material), an increase of about 55 weight percent. Infrared analysis indicated considerably intensified carbonyl adsorption bands. This example and Example II show that good contact of the asphaltenes with oxygen is essential for satisfactory operation of this process. The product can be used as a drying oil or refinery feedstock.

EXAMPLE IV

As in Example III, a sample of the pulverized Wasson asphaltenes of Example II was placed in a column to a depth of 8 inches. Moist air produced by bubbling the feed stream through water at the operating temperature (130° F.) was then passed through the column for 1 hour at the rate of 3 standard cubic feet per hour per 100 gm. of asphaltenes. The product was then Soxhlet extracted and found to contain 14.6 percent extractables, an increase of 9.3 percent (by weight of the starting material), an increase of 175 weight percent. Infrared analysis indicated considerably intensified carbonyl adsorption bands as compared to the extract of Example III. This example indicates that water vapor can significantly increase the production of the desired product. The product can be used as a drying oil or refinery feedstock.

EXAMPLE V

A bed of Monogas Zone II asphaltenes was contacted with oxygen at 75–80° F. for 7 hours. The oxidized asphaltenes were extracted with n-pentane and it was found that the product contained 11 percent viscous liquid product which was produced from the asphaltenes by treatment with oxygen per se. The product can be used as a drying oil or refinery feedstock.

The liquid product thus formed is characterized in the following table.

Table.—n-Pentane Soxhlet extract of asphaltenes treated with oxygen

| | |
|---|---|
| Yield, wt. percent | 10.6 |
| Composition, wt. percent: | |
| Carbon | 83.0 |
| Hydrogen | 9.0 |
| Oxygen | 1.3 |
| Nitrogen | 1.3 |
| Sulfur | 4.2 |
| Average molecular wt. | 698 |
| H/C molecular ratio | 1.30 |

The asphaltenes treated according to Example V, in particular, had melting point reductions from 352–370° F. to 300–310° F. by the oxidative treatment of the invention.

It will also be observed from the preceding examples that the liquid products formed, when allowed to air dry, dry to a tough film, thus demonstrating that the fluid extract products are useful as drying oils that can be used to formulate coating compositions such as paints, etc.

Reasonable variation and modification are possible within the scope of the foregoing disclosure and the appended claims to the invention, the essence of which is that a process is provided for producing useful liquid products from asphaltenes which comprises oxidizing same at an elevated temperature not exceeding about 200° F. for a period of time sufficient to reduce the melting point of the asphaltenes and produce said liquid product.

I claim:

1. A process for producing liquid products from asphaltenes and reducing the melting point of said asphaltenes which comprises oxidizing same by contacting with an oxygen-containing gas selected from oxygen and air at an elevated temperature of 50–200° F. for a period of time sufficient to reduce the melting point of said asphaltenes and produce said product.

2. A process according to claim 1 wherein said contacting is effected at a temperature in the range of 50–190° F. a pressure between one atmosphere and 20 atmospheres, and for a period of time between about 10 minutes and 48 hours.

3. A process according to claim 1 wherein said oxygen-containing gas is air saturated with water vapor.

4. A process according to claim 1 wherein said oxygen-containing gas is oxygen.

5. A process according to claim 1 wherein said elevated temperature is in the range 75–160° F., wherein the rate of contacting ranges from about 0.1 to 4000 standard cubic feet of oxygen-containing gas per hour per 100 grams of asphaltene.

6. A process according to claim 1 wherein said oxidized asphaltene is contacted with a hydrocarbon solvent to extract the liquid product from the thus treated asphaltene.

7. A process according to claim 6 wherein said solvent is n-pentane.

8. A process according to claim 1 wherein a bed of asphaltenes is contacted with an oxygen-containing gas and continued for a period of time sufficient to reduce the melting point of the asphaltenes and produce a liquid product, the oxidation is then discontinued and then the oxidized bed of asphaltenes is contacted with a hydrocarbon solvent to extract the liquid product therefrom.

9. A process according to claim 1 wherein said asphaltene is in particulate form and is oxidized by a fluidized bed technique by contacting with said oxygen-containing gas as the fluidizing medium.

References Cited

UNITED STATES PATENTS 2,046,081   6/1936   McNeil _____ 208—44

(Other references on following page)

UNITED STATES PATENTS

| | | | |
|---|---|---|---|
| 2,131,205 | 9/1938 | Wells | 208—44 |
| 2,755,223 | 7/1956 | Illman | 208—44 |
| 3,116,229 | 12/1963 | Eisenhut | 208—44 |
| 2,560,650 | 7/1951 | Kronstein | 208—44 |
| 2,662,051 | 12/1953 | Pelzer | 208—44 |
| 3,318,797 | 5/1967 | Campbell | 208—44 |

DELBERT E. GANTZ, Primary Examiner

V. O'KEEFE, Assistant Examiner

U.S. Cl. X.R.

208—6